Figure 1:
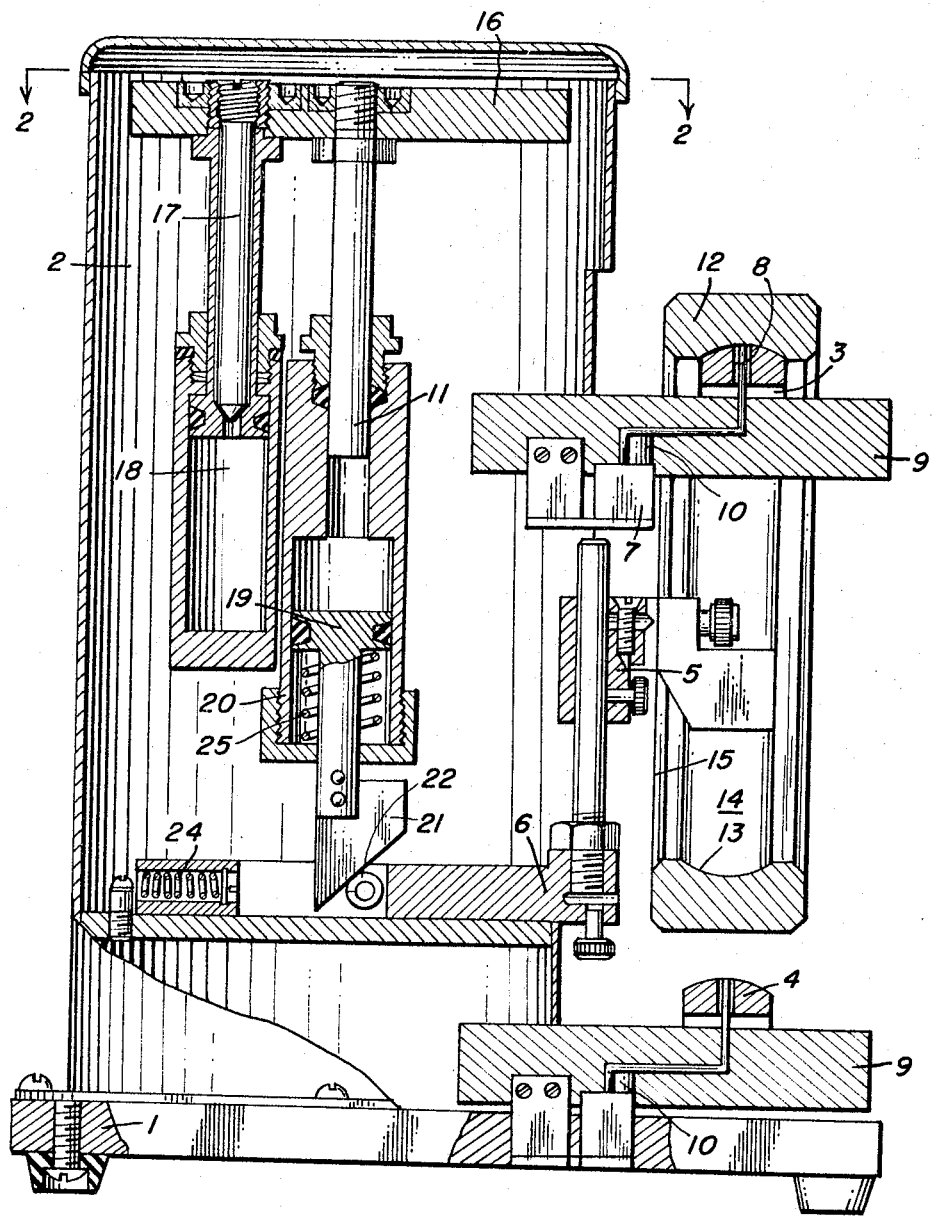

May 16, 1967 A. N. SALMANOV ET AL 3,319,463
DEVICE FOR MEASURING MICRO-ROUGH CURVILINEAR SURFACES
Filed Feb. 12, 1964 2 Sheets-Sheet 1

INVENTORS
ANATOLY NICOLAEVICH SALMANOV AND
VASILY FEODOROVICH SOVKIN 3,319,463
DEVICE FOR MEASURING MICRO-ROUGH
CURVILINEAR SURFACES
Anatoly Nicolaevich Salmanov and Vasily Feodorovich
Sovkin, both of Kuibyshev, U.S.S.R., assignors to
Kuibyshevsky Politekhnichesky Institute "Kuibyshev"
Filed Feb. 12, 1964, Ser. No. 344,327
2 Claims. (Cl. 73—105)

The invention relates to a precision measuring instrument and more particularly to instruments for measuring micro-rough curvilinear surfaces by means of an inductive pick-up.

The instruments currently used for measuring micro-rough surfaces of samples contemplate the measurement at several points of the surface with a subsequent reduction of the results thereof to the mean level. The above method is not too efficient since it does not comprehend the entire surface or allow the measurement of the surface of ball bearing ring grooves along the arc genetrices.

The conventional methods for measuring micro-rough surfaces with the assistance of known devices are predicated on the principle of a straight measuring path in which the workpiece being checked is adjusted and fixed in a simple known manner. The measurement of micro-rough curvilinear surfaces requires complex adjustment and fixing of the article being checked and thus necessitates, in the known devices, additional appliances which affect the accuracy and efficiency of the measurements.

Unlike the prior art structures, the present measuring instrument permits a simple and reliable positioning of the article to be checked with the article being freely suspended from a support and maintained in position by gravity, with self-alignment of the article taking place immediately with respect to the axis of symmetry due to the displacement of the center of gravity below the suspension point. During measurement, the article is rotated in a plane normal to the groove so that the surface to be measured slides relative to the probe.

Generally, the present invention is directed to an instrument for measuring micro-rough curvilinear surfaces and more particularly the surface of a groove provided in a ball bearing ring, comprising a body, an adjusting knife segment rigidly mounted on the body and having a radius of curvature corresponding to the radius of curvature of the groove in the ring to be measured, said segment serving as the axis around which a ring is freely suspended therefrom with the ring being immediately self-aligning so that its center of gravity and geometric axis lie on the plane of the segment, an inductive pick-up supported by the body, a probe for the pick-up, said segment having a slot through which the probe is adapted to extend to be in constant contact with the surfaces of the groove and oscillate transversely in dependence on the micro-roughness of the surfaces, a horizontally movable support ruler mounted on the body adapted to contact an end face of the ring and position the end face on a plane normal to the plane of said knife segment, a slide mounted for horizontal movement in the body, means securing the support ruler to the slide, and means operably connected to the ruler within the body to move the ruler horizontally comprising a vertically disposed amplifier cylinder, a piston within the cylinder, a wedge operably connected to the piston, a roller for the slide with which the wedge coacts, a hydraulic cylinder braking means, a weight located above the amplifier cylinder and cylinder braking means, movement transmitting means between the weight and piston, and means operably related between the cylinder braking means and the weight so that when the weight moves downwardly in the body the braking means effects a uniform and downward movement of the piston and wedge whereby the wedge bears against the roller and displaces the slide and ruler horizontally.

Figure 2:
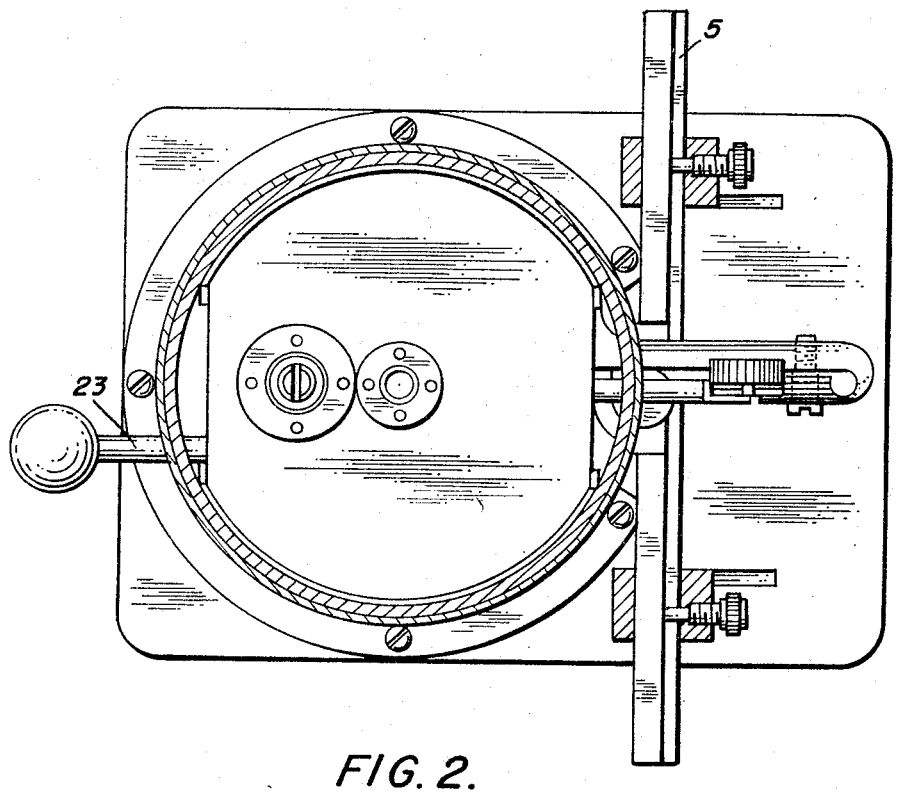

Further objects and advantages of the invention will become more readily apparent to persons skilled in the art from the following detailed specification and attached drawings, and in which drawings:

FIG. 1 is a side view partly in elevation and partly in cross section of an embodiment of the invention, and FIG. 2 is a view taken along the line A—A, the view looking in the direction of the arrows.

As shown in the drawings, the instrument comprises a base 1 having supporting feet, a body 2 rigidly mounted on the base 1, adjusting knife segments 3 and 4 secured to the body 2, a support ruler 5 fixed to a slide 6 slidably mounted on the body 2, an inductive pick-up 7 mounted on the body 2 and provided with a probe 8 arranged on a suspension element 9 which is movably mounted on the body 2, a ferrite magnet 10 and means 11 to move the ruler 5.

An outer ball bearing ring 12 having a groove 14 and whose surfaces 13 are to be measured is positioned on the knife segment 3 having a radius of curvature, as previously mentioned, equal to that of the groove, and end face 15 of the ring contacts of the ruler 5. The means 11 for moving the ruler 5 includes a weight 16 slidably mounted in the body 2. A hydraulic braking cylinder 18 is provided with a pin 17 which controls the movement of the weight 16. The means 11 located on the weight is provided with a stationary element secured to the body 2 for transmitting the pressure of the weight 16 upon the lowering thereof. A hydraulic amplifier 20 is rigidly mounted on the body 2 and includes a slidably mounted piston 19. The lower end of the rod for piston 19 carries a wedge-like member 21, the inclined surface of which coacts with roller 22 to impart movement to the slide 6 and consequently to the ruler 5. Springs 24 and 25 operatively associated with the slide 6 and piston 19, respectively, function to return the slide and piston to their initial position or the position illustrated in FIG. 1.

A handle 23 provided with a cam at the end serves to raise or lower the weight 16. When the ring 12 is positioned with the groove 14 on the segment 3, the end face 15 is in contact with the ruler 5. The handle 23 is manipulated and the weight and means 11 move downwardly from the initial position at a speed proportioned to the movement of the pin 17 of the cylinder 18. At the same time, the piston 19 also moves downwardly against the action of the spring 25 so that the wedge-like member 21 through the roller 22 and against the action of the spring 24 displaces the slide 6 and ruler 5. As a result, the ring 12 rotates relative to the segment 3 which serves as the axis around which the groove 14 of the ring turns in a freely suspended condition.

During rotation, the probe 8 of the pick-up 7 probes the surfaces 13 of the groove 14 and oscillates transversely in dependence on the micro-roughness of the surfaces. The rotation of the ring 12 being measured by the resistance of the weight 16 adjusts the end face 15 so that the path of measuring runs in a plane normal thereto as well as the micro-rough projections of the groove 14. A suitable recording or equivalent means including an oscillograph may be utilized to record the microgeometric measurements.

Upon the measurement being completed, the weight 16 may be elevated to its initial position by the manipulation of the handle 23 and the springs 24 and 25 return the slide 6 and piston 19, respectively, to the position illustrated in FIG. 1.

In the measurement of surfaces of the grooves of inner ball bearing rings, the knife segment 4 is employed and this segment is related to a movably mounted probe. Any outside vibrations which may affect the functioning of the probe 8 are eliminated by the magnet 10.

By virtue of the invention it will be appreciated that the measurement procedure is substantially simplified and the accuracy and reliability of the data obtained materially increased.

The invention is not to be confined to any strict conformity to the showings in the drawings but changes or modifications may be made therein so long as such changes or modifications mark no material departure from the spirit and scope of the appended claims.

What we claim is:

1. An instrument for measuring micro-rough curvilinear surfaces and more particularly the surface of a groove provided in a ball bearing ring, comprising a body, an adjusting knife segment rigidly mounted on the body and having a radius of curvature corresponding to the radius of curvature of the groove in the ring to be measured, said segment serving as the axis around which a ring is freely suspended therefrom with the ring being immediately self-aligning so that its center of gravity and geometric axis lie on the plane of the segment, an inductive pick-up supported by the body, a probe for the pick-up, said segment having a slot through which the probe is adapted to extend to be in constant contact with the surfaces of the groove and oscillate transversely in dependence on the micro-roughness of the surfaces, a horizontally movable support ruler mounted on the body adapted to contact an end face of the ring and position the end face on a plane normal to the plane of said knife segment, a slide mounted for horizontal movement in the body, means securing the support ruler to the slide, and means operably connected to the ruler within the body to move the ruler horizontally comprising a vertically disposed amplifier cylinder, a piston within the cylinder, a wedge operably connected to the piston, a roller for the slide with which the wedge coacts, a hydraulic cylinder braking means, a weight located above the amplifier cylinder and cylinder braking means, movement transmitting means between the weight and piston, and means operably related between the cylinder means and the weight so that when the weight moves downwardly in the body the braking means effects a uniform and downward movement of the piston and wedge whereby the wedge bears against the roller and displaces the slide and ruler horizontally.

2. The instrument for measuring micro-rough curvilinear surfaces as claimed in claim 1 including spring means operably related to the slide and piston respectively for moving the slide away from the ring and the wedge away from the roller.

References Cited by the Examiner

UNITED STATES PATENTS

| 2,407,490 | 9/1946 | Gregg | 33—174 |
| 2,621,224 | 12/1952 | Priest | 73—105 X |
| 2,636,380 | 4/1953 | Van Dorn | 73—37.5 |
| 2,691,887 | 10/1954 | Rinker | 73—105 |
| 3,087,329 | 4/1963 | Grodek et al. | 73—105 |
| 3,166,852 | 1/1965 | Whitney | 33—174 |

RICHARD C. QUEISSER, *Primary Examiner.*

J. J. SMITH, *Assistant Examiner.*